(12) United States Patent
Tamilmani

(10) Patent No.: US 9,230,011 B1
(45) Date of Patent: Jan. 5, 2016

(54) INDEX-BASED QUERYING OF ARCHIVED DATA SETS

(71) Applicant: Amazon Technologies, Inc., Reno, NV (US)

(72) Inventor: Karthik Tamilmani, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 55 days.

(21) Appl. No.: 13/689,919

(22) Filed: Nov. 30, 2012

(51) Int. Cl.
*G06F 17/30* (2006.01)

(52) U.S. Cl.
CPC .................... *G06F 17/30613* (2013.01)

(58) Field of Classification Search
USPC .................................................. 707/706, 741
See application file for complete search history.

(56) References Cited

U.S. PATENT DOCUMENTS

| | | | | |
|---|---|---|---|---|
| 4,855,907 A | * | 8/1989 | Ferro et al. | 1/1 |
| 5,251,316 A | * | 10/1993 | Anick et al. | 1/1 |
| 5,758,145 A | * | 5/1998 | Bhargava et al. | 707/744 |
| 5,857,203 A | * | 1/1999 | Kauffman et al. | 1/1 |
| 6,182,151 B1 | * | 1/2001 | Cheng et al. | 719/310 |
| 6,965,904 B2 | | 11/2005 | Bankert et al. | |
| 7,158,996 B2 | * | 1/2007 | Croisettier et al. | 707/741 |
| 7,447,717 B2 | * | 11/2008 | Bower et al. | 1/1 |
| 7,600,682 B2 | | 10/2009 | Bezos et al. | |
| 7,636,728 B2 | * | 12/2009 | Novak | 1/1 |
| 7,689,538 B2 | * | 3/2010 | Li et al. | 707/999.002 |
| 8,046,353 B2 | | 10/2011 | Waters | |
| 8,051,045 B2 | | 11/2011 | Vogler | |
| 8,190,610 B2 | | 5/2012 | Dasdan et al. | |
| 8,306,978 B2 | * | 11/2012 | Bower et al. | 707/736 |

* cited by examiner

*Primary Examiner* — Kim Nguyen
(74) *Attorney, Agent, or Firm* — Robert C. Kowert; Meyertons, Hood, Kivlin, Kowert & Goetzel, P.C.

(57) ABSTRACT

Methods and systems for index-based querying of archived data sets are disclosed. A plurality of indices are generated, each comprising a plurality of pointers to storage locations of a plurality of updates to a document. A query request is received after generating the plurality of indices. The query request comprises an identifier of the document and a specified time range. A subset of the indices that comprise the identifier of the document within the specified time range are determined. From the subset of the indices are retrieved a subset of the pointers to the storage locations for one or more of the updates to the document within the specified time range. The one or more updates to the document within the specified time range are retrieved using the subset of the plurality of pointers.

23 Claims, 6 Drawing Sheets

INDEX-BASED QUERYING OF ARCHIVED DATA SETS

BACKGROUND

Electronic catalog servers, such as those associated with large e-commerce sites, often store large quantities of catalog data to which updates are frequently made. The updates may be received over an extended period of time, such as several months or years, and the quantity of the updates over time may be sufficiently large to require the use of archive storage systems in addition to a live data store. Users and administrators of electronic catalog systems may seek to access the updates made to the catalog data, e.g., for various troubleshooting or marketing purposes. In order to facilitate access to the updates, there may be live or dynamic indexing performed on the live data store. However, such dynamic indexing may affect the throughput and performance of the electronic catalog systems, and may also require increasingly larger storage space for the dynamic index over time.

Archive storage systems may work well for storing hundreds or thousands of objects that are on the order of multiple megabytes. However, such storage systems often do not work as well for storing hundreds of millions to billions of very small records (e.g., kilobytes in size). Additionally, when querying archived data, retrieving the desired archived data is often a challenge that requires a separate search of the archive media itself.

Accordingly, it is desirable to have techniques for querying archived data sets in an efficient manner.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for index-based querying of archived data sets are described. Using the systems and methods described herein, forward indices for very large data sets (e.g., billions of records) may be created and queried in a fast and scalable manner. Prior to the receipt of a query request, forward indices pointing to the recent updates for a given key may be precomputed. When a query request comprising one or more keys and a time range is received, the updates to the one or more keys over the time range may be retrieved efficiently using the precomputed forward indices.

The archived data sets may be associated with updates to an electronic catalog system. The electronic catalog system may host an electronic catalog listing a variety of items. The electronic catalog may also provide functionality for users to acquire catalog items from various catalog item providers. For example, the electronic catalog system may be part of an electronic commerce ("e-commerce") site that hosts an electronic catalog of many millions of items offered for sale or otherwise made available by numerous retailers, sellers, vendors, merchants, etc. (collectively and interchangeably referred to herein as "merchants"). One example of such an e-commerce site is described in U.S. Pat. No. 7,600,682, titled "Marketplace System in Which Users Generate Preorder Listings Via a Definitive Product Catalog," issued on Oct. 13, 2009.

In the example of an e-commerce site, the items available through the electronic catalog may be associated with various elements of item data. The item data may include attributes such as price, availability, title, item identifier, item feedback (e.g., user reviews, ratings, etc.), item image, item description, and various other item attributes. Typically, the item data associated with an item may range from a few kilobytes to a few megabytes in size. The item data may be updated at various points in time, and the updates may come from various sources of item data (manufactures, sellers, retailers, other components of the electronic catalog system, etc.).

In many circumstances, a user of, an administrator of, or an application in communication with the electronic catalog may have a need to analyze the updates associated with a particular catalog item or group of catalog items. For example, an administrator may wish to review the updates associated with a particular item to pinpoint the source of erroneous catalog data. As another example, a merchant, analyst, or other entity may wish to analyze the price histories of particular items. In order to analyze the complete history of items, access may be provided to not only the latest updates to those items, as would be stored in a live data store, but also to the historical updates which may have been moved to an archive data store. An indexing scheme providing transparent access to the objects (or pointers to the updates stored in the archive data store) as well as to the updates in the live data store may allow a fast response to queries from such users, administrators, and applications, without affecting the performance of the electronic catalog server.

The updates to the electronic catalog may be organized into objects comprising collections of records, and the objects may be archived. The objects may have pointers, keys, and values associated with the records within them. The objects may be stored in a database of product information that typically includes product IDs along with descriptions and product images provided by the catalog update providers. The product information in this database may be viewable by users through a browsable electronic catalog. The various pages of the electronic catalog may be in the form of web pages, display screens of an electronic services network or interactive television system, pages that are specially configured for display on smartphones, tablets, or other mobile devices, or any other type of suitable electronic display available to users.

In the example of an e-commerce site, the availability of a product or the number of units available of a specific product may change over time due to the sale or disposal of the product through the electronic catalog system. In one embodiment, merchants may add to or change a listing of a particular product within the e-commerce site. An update processing system connected to the electronic catalog system (or e-commerce site) may be used to facilitate the updates to the products as well as the processing of input provided by the merchants. In one embodiment, the electronic catalog system may provide up-to-date catalog data to end users, without degradation in the performance (e.g., latency) experienced by the users, even when the update processing system is receiving update messages at a very high rate.

Figure 1:
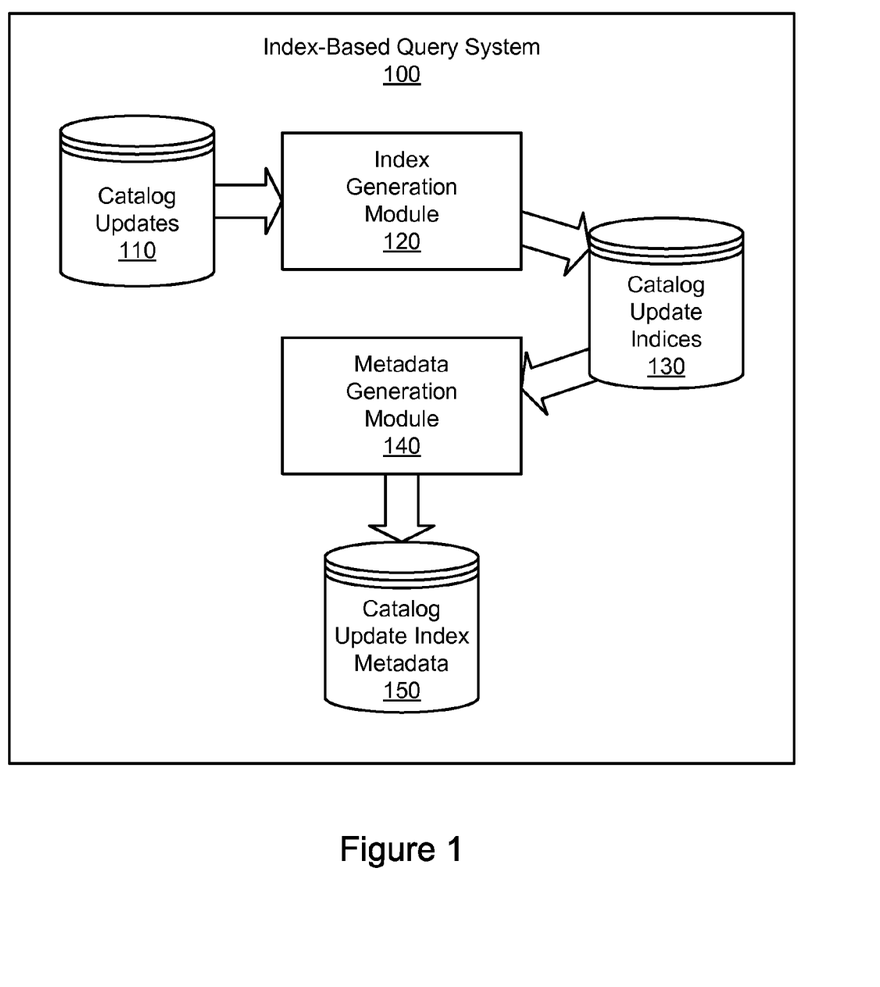
FIG. 1 illustrates an example system environment for index-based querying of archived data sets, according to one embodiment.

FIG. 1 illustrates an example system environment for index-based querying of archived data sets, according to one embodiment. The example system environment may comprise an index-based query system 100. The index-based query system 100 may include various modules such as an index generation module 120 and a metadata generation module 140. The index-based query system 100 may also include or have access to various elements of storage such as catalog updates 110, catalog update indices 130, and catalog update index metadata 150. The index-based query system 100 may comprise one or more computing devices, any of which may be implemented by the example computing device 3000 illustrated in FIG. 5. In various embodiments, the functionality of the different modules (e.g., index generation module 120 and metadata generation module 140) may be provided by the same computing device or by different computing devices. If the index generation module 120 and metadata generation module 140 are implemented using different computing devices, then the modules and their respective computing devices may be communicatively coupled, e.g., via a network. The index generation module 120 and metadata generation module 140 may each represent any combination of software and hardware usable to perform their respective functions, as discussed as follows.

The catalog updates 110 may comprise updates to an electronic catalog, as discussed above. In one embodiment, the catalog updates 110 may comprise archived or historical updates. In another embodiment, the catalog updates 110 may comprise new or recent updates in addition to archived or historical updates. For an electronic catalog, examples of item attributes whose historical updates may be stored include, but are not limited to: batteries_included, batteries_required, binding, catalog_number, color, item_dimensions, item_name, item_package_dimensions, list_price, manufacturer, model_number, product_category, product_type, vendor_name, etc.

In one embodiment, the catalog updates 110 may be stored as "chunks" in a storage system configured for large volumes (e.g., multiple megabytes in size) of relatively small records. In this storage system, individual catalog updates may be coalesced as a block (i.e., a chunk), and the block may be appended to a bucket as a new object. A bucket containing chunks may be referred to as a chunk store. In one embodiment, individual chunks may be configured to be up to 16 MB or 64 MB in size.

In one embodiment, the index generation module 120 may generate a plurality of catalog update indices 130 based on the catalog updates 110. The catalog update indices 130 may comprise forward indices. The catalog update indices 130 may comprise read-only database (RODB) indices that are implemented as RODB partitions. The RODB indices may be partitioned widely by key space. In one embodiment, the use of partitions may permit the efficient storage and retrieval of very large quantities (e.g., billions) of catalog updates. Each of the catalog update indices 130 may comprise one or more keys and one or more pointers or other references to storage locations of the catalog updates 110 relating to the document(s) identified by the one or more keys. The references to storage locations may comprise both pointers and offsets. The one or more keys may identify a document such as a web page or a set of data describing a product listing at an e-commerce website. In one embodiment, the keys may include a unique product identifier and a marketplace identifier. The marketplace identifier may uniquely identify various marketplaces, subdomains, or other sections of an e-commerce website. In one embodiment, various ones of the marketplaces may be specific to regional or national variants of the e-commerce website.

The catalog update indices 130 for a given document (as identified by the one or more keys) may be precomputed. In other words, the catalog update indices may be generated by the index generation module 120 prior to the index-based query system receiving a query relating to the contents of particular catalog update indices. In one embodiment, the index generation module 120 may generate new catalog update indices automatically for new updates to the catalog. For example, the index generation module 120 may generate new catalog update indices according to a schedule and on a periodic basis, e.g., once per week (or other suitable time period) for catalog updates entered over the most recent week (or other suitable time period). Accordingly, the catalog update indices 130 may comprise individual indices covering different time ranges back to a point in time when the catalog update indices 130 were first generated. In one embodiment, the catalog update indices 130 may be created as often as needed, depending on how frequently the underlying documents change. In one embodiment, the index generation module 120 may be implemented using a computing resource provisioning service that supports data-intensive distributed applications. Further details regarding embodiments of the index generation module 120 are discussed with respect to FIG. 4.

The metadata generation module 140 may generate catalog update index metadata 150 based on the catalog update indices 130. In one embodiment, the catalog update index metadata 150 may comprise a subset of the information in the catalog update indices 130. For example, the catalog update index metadata 150 may comprise the key block headers of the catalog update indices 130. In one embodiment, the catalog update index metadata 150 may comprise an indication of the different keys and time range(s) included in a particular catalog update index. The catalog update index metadata 150 may indicate which partition of an index includes catalog updates for a particular period of time. The metadata generation module 140 may generate the catalog update index metadata 150 prior to the index-based query system receiving a query relating to the contents of particular catalog update indices. In one embodiment, the catalog update index metadata 150 may be generated and/or loaded (e.g., into a cache memory) upon launching an application or web service that supports queries of the catalog updates 110.

Figure 2:
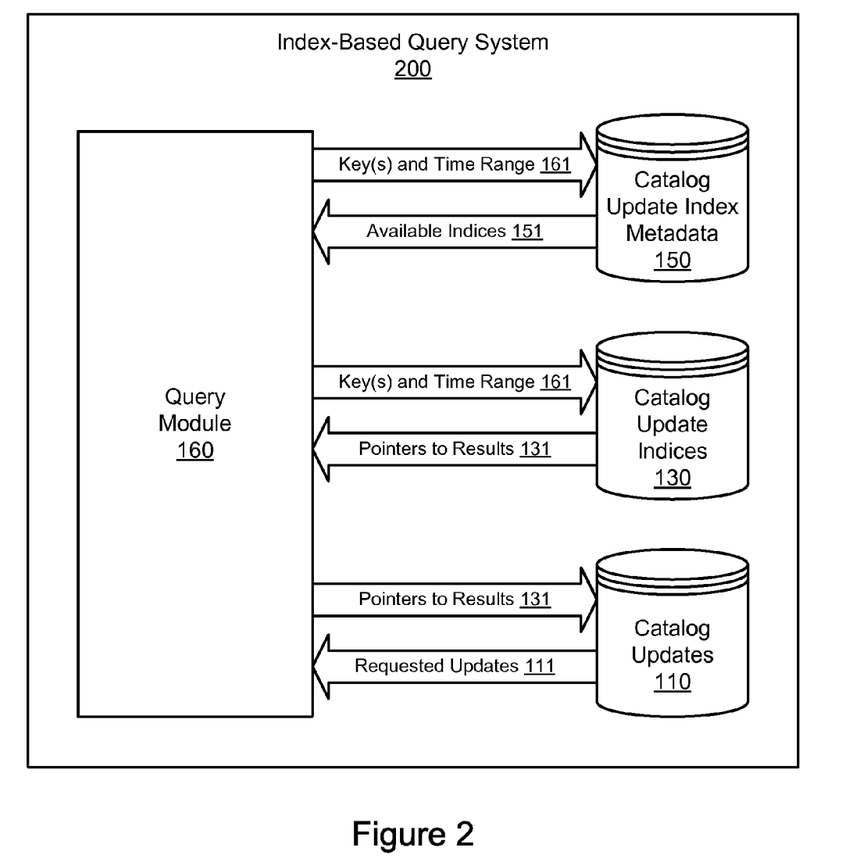
FIG. 2 illustrates further aspects of an example system environment for index-based querying of archived data sets, according to one embodiment.

FIG. 2 illustrates further aspects of an example system environment for index-based querying of archived data sets, according to one embodiment. The index-based query system 200 may include various modules such as a query module 160. The index-based query system 200 may also include or have access to various elements of storage such as the catalog updates 110, the catalog update indices 130, and the catalog update index metadata 150, as discussed above. The index-based query system 200 may comprise one or more computing devices, any of which may be implemented by the example computing device 3000 illustrated in FIG. 5. In various embodiments, the functionality of the query module 160 may be provided by the same computing device or by different computing devices as the functionality of the index generation module 120 and/or metadata generation module 140. If the query module 160, index generation module 120, and metadata generation module 140 are implemented using different computing devices, then the modules and their respective computing devices may be communicatively coupled, e.g., via a network. The query module 160 may represent any combination of software and hardware usable to perform its respective functions, as discussed as follows.

In one embodiment, the query module 160 may preload the catalog update index metadata 150 and discover all available catalog update indices before receiving a query, e.g., at startup of the query module 160. A user such as an administrator or provider of the index-based query system 200 may seek to obtain historical or archived catalog updates. Using a suitable user interface (e.g., a graphical user interface), the user may supply a query request to the query module 160. The query request may comprise one or more keys and a time range. In one embodiment, the one or more keys may include a unique product identifier and a marketplace identifier. The time range may be specified by a start time and an end time. After the query request is received using the query module 160, the updates to the one or more keys over the time range may be retrieved using the precomputed catalog update indices 130.

In particular, the query module 160 may first inspect the catalog update index metadata 150 to determine which of the catalog update indices 130 contain relevant entries for the specified key(s) and time range 161. In this manner, the query module 160 may identify a set of available indices 151 that contain the specified key(s) in the specified time range. The query module 160 may then perform a query on the relevant catalog update indices 130 using the specified key(s) and time range 161 to obtain pointers to results 131 of the query. Using the pointers 131 to storage locations of the catalog updates 110, the query module may then retrieve the requested catalog updates 111 from their respective storage locations. In one embodiment, the query module 160 may display the retrieved catalog updates to the user using any appropriate user interface.

As discussed above, the index-based query system 200 may be used by an administrator or provider of an electronic catalog system or an update processing system to run queries for item data updates pertaining to a particular item in the catalog. In the example of an e-commerce site, the query may be directed to determining the price history of the item. This price history may in turn be used to locate the exact price of an item at a given point in time, or alternatively, to determine the origin of a possible error in data entry of the said item price. Querying the archived catalog updates 110 may also be useful to efficiently find a bad record among the several million or billion records of item data in the electronic catalog. For example, the administrator of an e-commerce site may use the archive storage system to identify the source of erroneous catalog data, such as price data, pertaining to a particular catalog item. Because such queries may be executed off-line (using computing resources separate from those that host the electronic catalog system), the execution of such queries may not impact performance as seen by end users of the electronic catalog system.

Figure 3A:
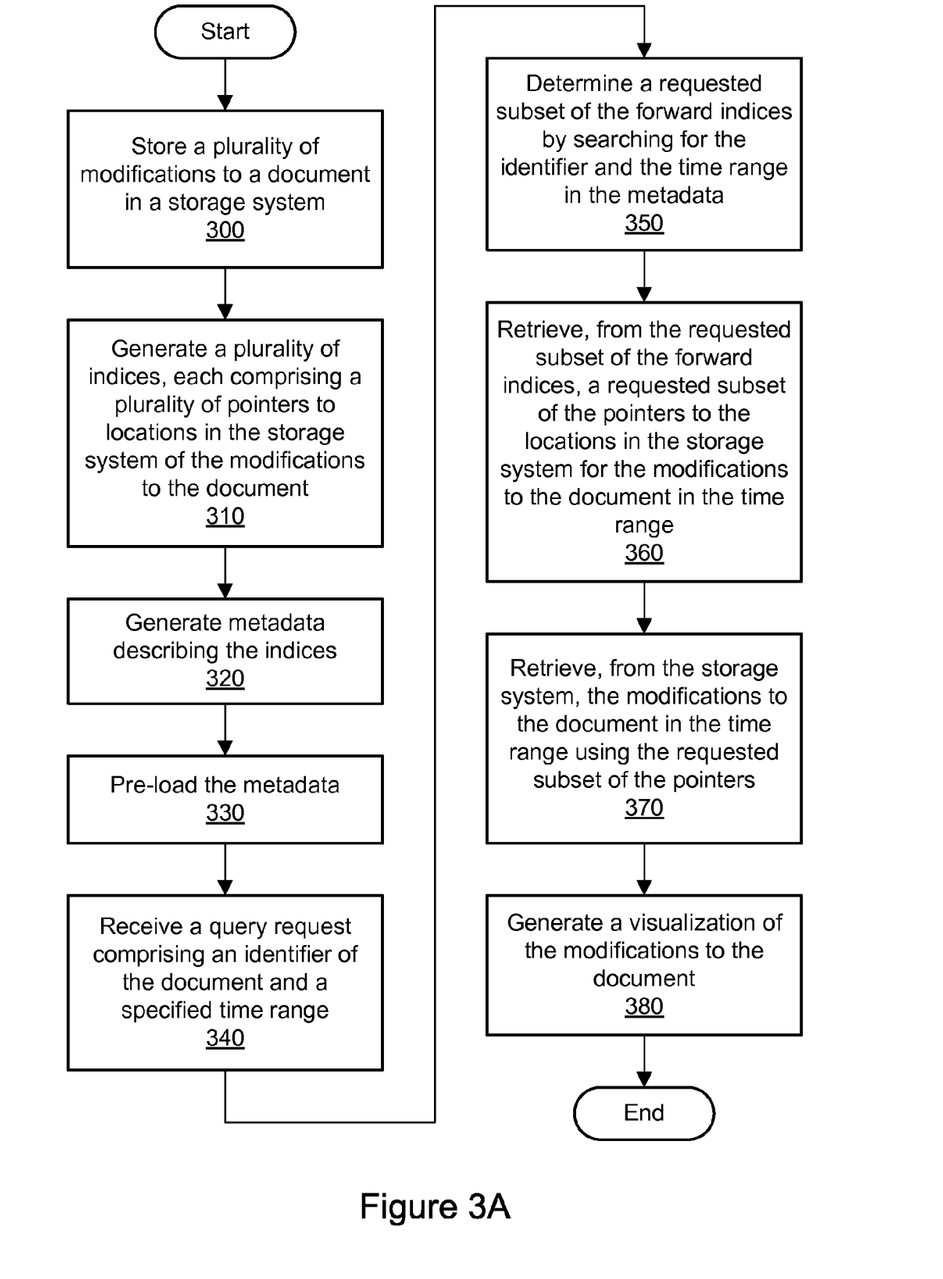
FIGS. 3A and 3B are flowcharts illustrating methods for index-based querying of archived data sets, according to one embodiment.

FIG. 3A is a flowchart illustrating a method for index-based querying of archived data sets, according to one embodiment. As shown in 300, a plurality of modifications to a document may be stored in a storage system. The document may comprise a web page or other document relating to a product offered by an e-commerce merchant. The modifications may comprise catalog updates, e.g., updates to elements of an item offered in an electronic catalog as described the web page or other document. In one embodiment, the modifications may be historical updates that are stored in an archive storage system.

As shown in 310, a plurality of forward indices may be generated. Each of the forward indices may comprise a plurality of pointers to locations in the storage system of the modifications to the document. In one embodiment, each of the forward indices may be generated for a different document and/or time range. Each of the catalog update indices 130 may comprise one or more keys and one or more pointers or other references to storage locations of the catalog updates 110 relating to the document(s) identified by the one or more keys. In one embodiment, the keys may include a unique product identifier and a marketplace identifier. In one embodiment, the forward indices may be generated automatically, e.g., according to a predetermined schedule.

As shown in 320, metadata describing the forward indices may be generated. In one embodiment, the index metadata 150 may comprise a subset of the information in the forward indices 130, e.g., the key block headers of the forward indices. As shown in 330, the metadata may be pre-loaded, e.g., into memory managed by a query module or other suitable application.

As shown in 340, a query request may be received. The query request may comprise an identifier of the document and a specified time range. As shown in 350, a requested subset of the forward indices may be determined. The operation shown in 350 may comprise searching for the identifier of the document and the specified time range in the metadata describing the forward indices. The operation shown in 350 may thus identify ones of the forward indices that are relevant to the query request.

As shown in 360, a requested subset of the pointers may be retrieved from the requested subset of the forward indices. The requested subset of the pointers may comprise pointers to the locations in the storage system for one or more of the modifications to the document in the specified time range. As shown in 370, the one or more modifications to the document in the specified time range may be retrieved from the storage system using the requested subset of the pointers.

As shown in 380, a visualization of the modifications to the document may be generated. Using the index metadata, the retrieved modifications may be transformed into a format that visually indicates the changes to the document over time. The visualization may be stored and/or presented to the user using any appropriate techniques. In one embodiment, the visualization may comprise a tabular format. In one embodiment, the visualization may comprise a timeline format. In the timeline format, links to the various modifications may be presented across a timeline (e.g., a horizontal axis) that represents the passage of time in appropriate units. The modifications initially may be presented in an abridged form or as a link on the timeline, and the user may "drill down" into a selected modification to obtain further information. In one embodiment, the transformation into the visualized format may be specified in the index metadata. For example, a tabular visualization may be generated based on a data structure in the metadata that indicates raw field names representing attributes to be displayed, field labels for the attributes to be displayed, a sort order, and any other appropriate information.

Figure 3B:
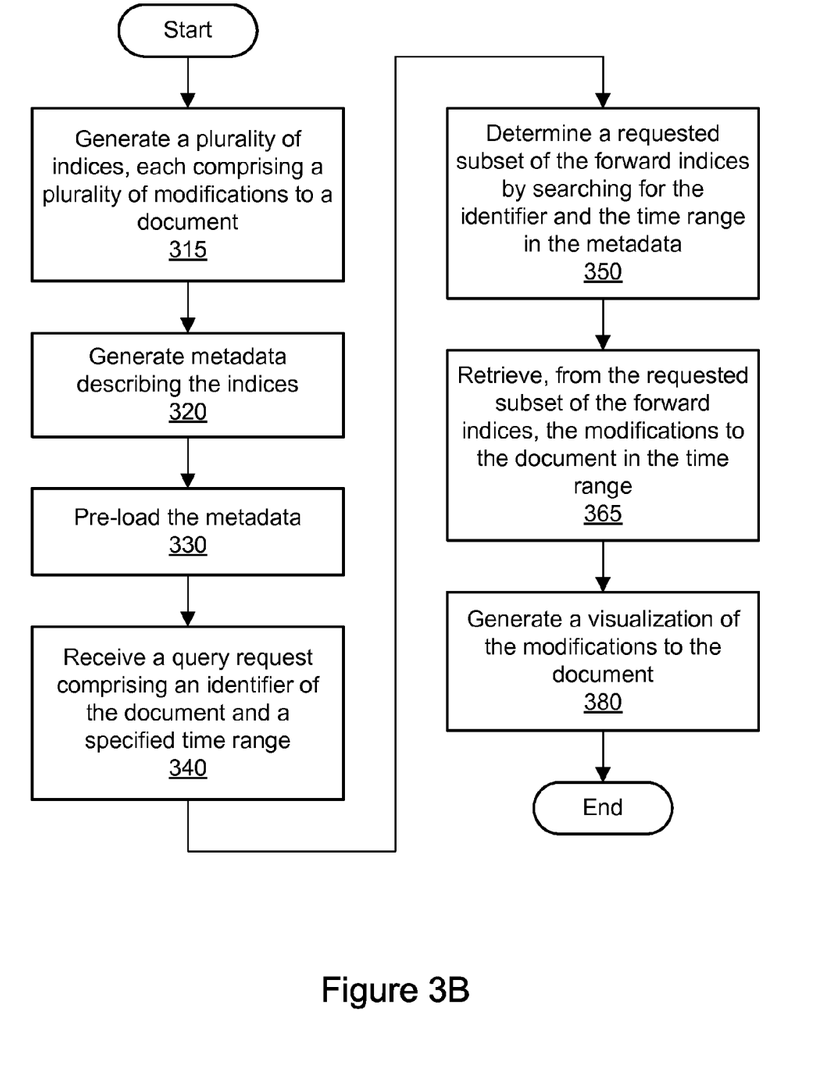

FIG. 3B is a flowchart illustrating an alternative method for index-based querying of archived data sets, according to one embodiment. As shown in 315, a plurality of forward indices may be generated. Each of the forward indices may comprise a plurality of modifications to a document and one or more keys identifying the document related to each modification. The document may comprise a web page or other document relating to a product offered by an e-commerce merchant. The modifications may comprise catalog updates, e.g., updates to elements of an item offered in an electronic catalog as described the web page or other document. In one embodiment, each of the forward indices may be generated for a different document and/or time range. In one embodiment, the keys may include a unique product identifier and a marketplace identifier. In one embodiment, the forward indices may be generated automatically, e.g., according to a predetermined schedule.

As shown in 320, metadata describing the forward indices may be generated. In one embodiment, the index metadata 150 may comprise a subset of the information in the forward indices 130, e.g., the key block headers of the forward indices. As shown in 330, the metadata may be pre-loaded, e.g., into memory managed by a query module or other suitable application.

As shown in 340, a query request may be received. The query request may comprise an identifier of the document and a specified time range. As shown in 350, a requested subset of the forward indices may be determined. The operation shown in 350 may comprise searching for the identifier of the document and the specified time range in the metadata describing the forward indices. The operation shown in 350 may thus identify ones of the forward indices that are relevant to the query request. As shown in 365, the one or more modifications to the document in the specified time range may be retrieved from the requested subset of the indices. As shown in 380, a visualization of the modifications to the document may be generated, as discussed above with respect to FIG. 3A.

Figure 4:
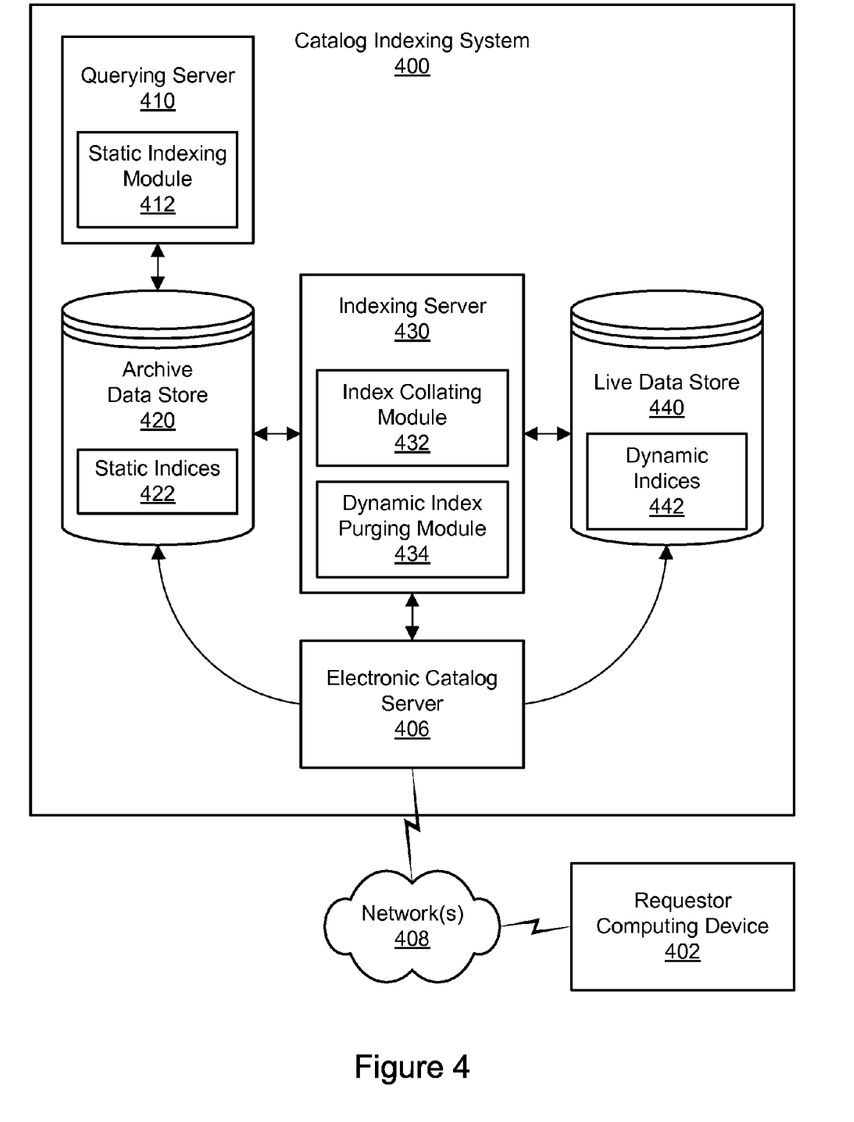
FIG. 4 illustrates an example system environment for a catalog indexing system, according to one embodiment.

FIG. 4 illustrates an example system environment for a catalog indexing system, according to one embodiment. The catalog indexing system 400 may be used for generating the catalog update indices 130, e.g., by providing functionality and storage resources usable by the index generation module 120. In one embodiment, the catalog indexing system 400 maybe used to efficiently index the archived objects to allow for relatively quick access to the pointers of the records, or if requested, retrieval of the records within the objects. The indexing scheme provided by the catalog indexing system 400 may also allow the periodic purging of the updates indexed by a dynamic indexing system which alleviates the strain on the live data store, thereby improving the performance of the electronic catalog server 406. The catalog indexing system 400 may also enable a requester wishing to retrieve updates associated with an item from the electronic catalog to do so without knowledge of the location of the stored update. In other words, whether the update is stored in the live data store or the archive data store, the requester may submit one request to the system and transparently receive updates or pointers to updates located on both stores.

In one embodiment, the electronic catalog server 406 may be part of an e-commerce site that provides functionality for users to interactively browse and make purchases from the electronic catalog. Administrators may also access the electronic catalog server 406 to perform routine maintenance or other administrative tasks, including gathering information regarding updates to the electronic catalog. Such users and administrators may remotely access the electronic catalog server 406 and browse the electronic catalog using various types of requestor computing devices 402 (one shown for purposes of illustration). In some embodiments, a requestor computing device 402 may comprise an application connected to the electronic catalog server to retrieve information regarding updates to the electronic catalog. The requestor computing devices 402 may be any of a number of types of computing devices that are capable of communicating over a network including, but not limited to, a laptop, personal computer, server computer, tablet computer, personal digital assistant (PDA), hybrid PDA/mobile phone, mobile phone, smartphone, electronic book reader, digital media player, and the like.

FIG. 4 depicts a distributed computing environment comprising several computer systems that are interconnected using one or more computer networks. However, it will be appreciated by those skilled in the art that the catalog indexing system 400 could equally operate within a computer system having a fewer or greater number of components than are illustrated in FIG. 4. Thus, the depiction of the catalog indexing system 400 in FIG. 4 should be taken as illustrative and not limiting to the present disclosure. For example, the catalog indexing system 400 could implement various web services components and/or peer-to-peer network configurations to implement at least a portion of the processes.

As shown in FIG. 4, the requestor computing devices 402 may communicate with the electronic catalog server 406 via one or more communication network(s) 408, such as the Internet or other communications link. Those skilled in the art will appreciate that the network 408 may be any wired network, wireless network, or combination thereof. In addition, the network 408 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

In one embodiment, the electronic catalog server 406 is generally responsible for providing an electronic catalog through a user interface in communication with various user devices, such as requestor computing device 402, via network(s) 408. The electronic catalog provided by the electronic catalog server 406 may generate text and/or graphics, possibly organized as a user interface using hypertext transfer or other protocols in response to information requests received from the various requestor computing devices 402.

The electronic catalog server 406 may be connected to or in communication with an archive data store 420 and a live data store 440. The archive data store 420 and the live data store 440 may be local to electronic catalog server 406, they may be remote to the electronic catalog server 406, and/or they may be network-based services themselves. The archive data store 420 may be connected to or in communication with querying server 410. A static indexing module 412 on the querying server 410 may generate one or more static indices 422 to index the updates stored on the archive data store 420. The static indices 422 may, in some embodiments, be stored on archive data store 420. In other embodiments, the static indices 422 may be stored on the querying server 410, or in another store or server illustrated in FIG. 4, or elsewhere, either locally or remotely.

The live data store 440 may include a dynamic index 442. The dynamic index 442 may be generated for the updates stored on the live data store 440. In the illustrated embodiment, both the archive data store 420 and the live data store 440 are connected to, or in communication with the indexing server 430. The indexing server 430 may include an index collating module 432 for collating the static indices 422 and the dynamic index 442. The indexing server 430 may also include a dynamic index purging module 434 to manage the size of the dynamic index 442.

At various points in time, the items available through the electronic catalog system 406 may have updates associated with them. The updates may be received from various catalog update providers. As the updates are received, they may be stored in live data store 440 and indexed in real-time for easy retrieval. The dynamic index 442 may be stored in the live data store 440. As more updates are stored in the live data store, and/or over time, the updates may need to be archived and stored in archive data store 420.

Updates may be archived in collection of records, or objects, wherein each of the records within an object may have a key representing a value associated with the item that was updated, and a version associated with the value of the updated item. The collections of records of data may be grouped together based on time, size, or some other criteria. Records may, for example, be appended to one another until the collection reaches a predetermined size, such as, for example, about a hundred to several hundred megabytes (MB). In other embodiments, the records may be grouped together until a predetermined interval of time is reached. For example, records may be successively appended for fifteen minutes, one hour, one day, or any other predetermined interval of time deemed appropriate for relevance of the update to the querying system. After the predetermined size or interval of time is reached, the collection of records may optionally be compressed.

The objects may also have object metadata associated with them, and the object metadata may allow for the static indexing of the records. Generally, object metadata may include any data used to describe aspects or properties of a given object. For example, object metadata may include information identifying the date of an object's creation, the identity of its creator, whether the object has any records associated with it, or other suitable information. In some embodiments, object metadata may include information indicative of usage characteristics of an object, such as the total size of records associated with an object, access history of users with respect to an object and/or its associated records, or any other suitable information related to current or historical usage of an object. In one embodiment, each object may be associated with a respective unique identifier, which may be automatically assigned by the archive data store 420. Additionally, a pointer to each record within the object may be stored within the object metadata or as a separate property or field of an object. In some other embodiments, a given object may include explicit references or pointers or other information corresponding to the records associated with a given object. By using the identifiers or pointers, it is possible to only decompress a specific record within the collections.

Once the updates are archived in archive data store 420, they can be indexed by the static indexing module 412 implemented by the querying server 410. The static indexing module 412 may generate one or more static indices in the background and independently of activity on the electronic catalog server 406 and therefore without affecting the performance of the electronic catalog server 406. The one or more static indices 422 generated by the static indexing module 412 may then be stored in the archive data store 420, or they may be stored on the querying server 410 or on another server or data store. The static indexing module 412 may also periodically update the one or more static indices 422.

In one embodiment, the catalog update indices 130 may be generated in a similar manner using the querying server 410. In response to a suitable query, the querying server 410 may create an index that contains a list of pointers (to storage locations) for each update to a key (e.g., an item ID). The index build queries may be automatically generated based on indexing metadata.

In one embodiment, the live data store 440 stores item data updates received for items available on the electronic catalog, in real-time, as the updates are received. The updates may be received from a variety of sources, including, for example, from merchants wishing to sell or otherwise make items available to consumers, from administrators of the electronic catalog server 406, and from others. The updates may include one or more of a change in the item's price, availability, title, item identifier, item feedback (e.g., user reviews, ratings, etc.), item image, item description, item attributes, etc. The live data store 440 may include a dynamic index 442. The dynamic index 442 may be generated in real-time based on the updates received by the live data store 440.

In the illustrated embodiment, the live data store 440 is in communication with the indexing server 430. The dynamic index purging module 434 of the indexing server 430 may be used to manage the size of the dynamic index 442 by purging updates from the dynamic index 442, in accordance with a routine.

The electronic catalog server 406 may make the updates available for query by catalog update providers or administrators of the electronic catalog server 406. For example, a query request may be input via a requestor computing device 402 and received by the electronic catalog server 406. The electronic catalog server 406 may then submit the request to the indexing server 430. The indexing server 430 may then, through the index collating module 432, respond to the request.

In some embodiments, each static index 422 may be a read-only database or read-only object stored in the archive data store 420, wherein the key associated with the object in the static index 422 is the key by which the results were aggregated, and the value of the object in the static index 422 is a pointer, wherein the pointer may point to the location of the object within the archive data store 420. As an example, the archive data store 420 may be queried for all updates pertaining to nonfiction books. When the query results are received, the static indexing module 412 may create an object in the static index 422 with the key being nonfiction books, with values corresponding to all a pointers to the object stored in the archive data store 420 corresponding to all updates to nonfiction books. Therefore, once such a static index 422 is created, if an administrator of the system later submits a query regarding updates to all nonfiction books, instead of scanning all the update records stored in archive data store 420 to locate the records associated with nonfiction books, the system would instead only need to locate a static index 422 by the key of nonfiction books among all static indices 422 created, and thereafter return the location of the object associated with that key, and then, if desired, retrieve only the update records of that object.

Therefore, the creation of the static indices 422 may allow the collections of records or objects stored in the archive data store 420 to be queried more efficiently, without having to scan all the objects in the archive data store 420. In one embodiment, only the static indices 422, which have aggregated results by keys are queried, and the results of such queries can be used to then locate the relevant object records in the archive data store. The static indices created may also, in some embodiments, be compressed and encrypted. Such a static indexing scheme allows several millions and even billions of update records to be queried with minimal random-access memory (RAM) requirements, and in little time, in the order of about 100 ms or less, in some embodiments.

As described above, there may be situations where a user or administrator of the electronic catalog server 406, or an application in communication with the electronic catalog server 406, may submit a query regarding updates to the electronic catalog items in the form of a request. The updates may then be used for performing various types of analysis regarding historical variations of item attributes, for troubleshooting the origin of bad records, and the like. In some embodiments, the user, administrator, or application may submit such query requests through a requestor computing device 402. In other embodiments, a query request may be submitted via a call to an application programming interface (API). The request may be received by the electronic catalog server 406 and then communicated to the indexing server 430.

Illustrative Computer System

Figure 5:
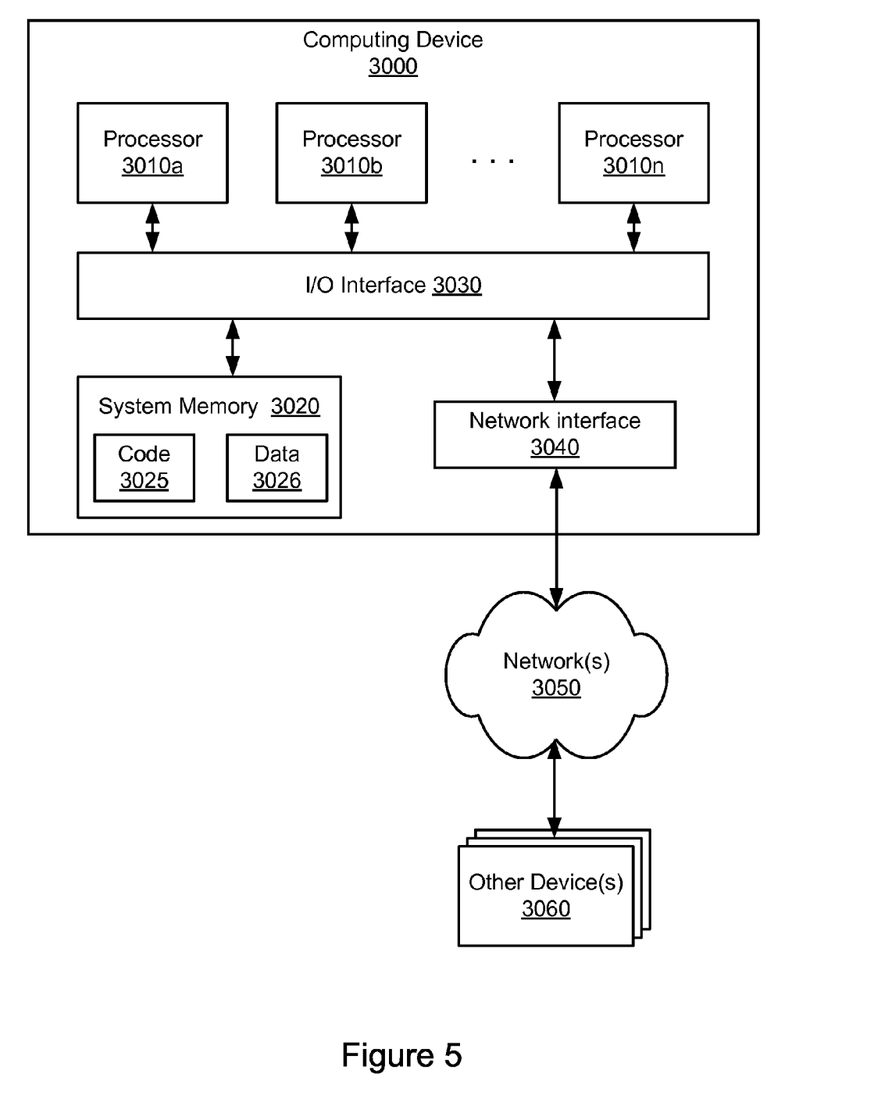
FIG. 5 illustrates an example computing device that may be used in some embodiments.

In at least some embodiments, a computer system that implements a portion or all of one or more of the technologies described herein, such as the index-based query system 100 and/or 200, may include a general-purpose computer system that includes or is configured to access one or more computer-readable media. FIG. 5 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1, 2, and/or 4, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 4 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 5 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computers configured to implement an index-based query system, wherein the index-based query system comprises:
   an index generation module configured to generate a plurality of forward indices, wherein individual forward indices of the plurality of forward indices comprise a plurality of pointers to a plurality of locations in a storage subsystem, wherein the plurality of locations in the storage subsystem store a plurality of modifications to a respective document of a plurality of documents, and wherein the individual forward indices correspond to different respective documents of the plurality of documents;
   a metadata generation module configured to generate metadata describing the forward indices of the plurality of forward indices, respectively, wherein the metadata comprises respective identifiers of the plurality of documents and a plurality of time ranges, wherein the metadata indicates which of the plurality of forward indices for a particular document identifier includes updates for a particular time range, and wherein different indices of the plurality of forward indices cover different time ranges; and
   a query module configured to:
   load the metadata;
   receive a query request after loading the metadata, wherein the query request comprises an identifier of a particular document of the plurality of documents and a specified time range;
   determine a requested subset of the forward indices, wherein to determine the requested subset the query module is configured to search the metadata for the identifier of the particular document in the specified time range;
   retrieve, from the requested subset of the forward indices, a requested subset of the plurality of pointers corresponding to one or more modifications to the particular document in the specified time range; and
   retrieve, from the storage subsystem, the one or more modifications to the particular document in the specified time range using the requested subset of the plurality of pointers.

2. The system as recited in claim 1, wherein the index generation module is configured to generate the plurality of forward indices automatically and periodically.

3. The system as recited in claim 1, wherein the index generation module is configured to generate the plurality of forward indices prior to the query module receiving the query request.

4. The system as recited in claim 1, wherein the metadata describing the forward indices comprises a subset of information in the forward indices.

5. The system as recited in claim 1, wherein the metadata describing the forward indices comprises one or more headers extracted from the forward indices.

6. A computer-implemented method, comprising:
   generating a plurality of indices, wherein individual indices of the plurality of indices comprise a plurality of pointers to storage locations of a plurality of updates to a respective document of a plurality of documents, wherein the individual indices correspond to different respective documents of the plurality of documents, and wherein different indices of the plurality of indices cover different time ranges;
   generating metadata describing the plurality of indices, wherein the metadata comprises respective identifiers of the plurality of documents and the different time ranges;
   receiving a query request after generating the plurality of indices and after generating the metadata, wherein the query request comprises an identifier of a particular document of the plurality of documents and a specified time range;
   determining, based at least in part on the metadata, a subset of the indices that correspond to the identifier of the particular document and to the specified time range;
   retrieving, from the subset of the indices, a subset of the plurality of pointers corresponding to one or more updates to the particular document within the specified time range; and
   retrieving the one or more updates to the particular document within the specified time range using the subset of the plurality of pointers.

7. The method as recited in claim 6, wherein the plurality of indices are generated automatically and periodically.

8. The method as recited in claim 6,
   wherein determining the subset of the indices that comprise the identifier of the document within the specified time range comprises searching the metadata for the identifier of the particular document in the specified time range.

9. The method as recited in claim 8, wherein the metadata describing the indices comprises a subset of information in the indices.

10. The method as recited in claim 8, wherein the metadata describing the indices comprises one or more headers extracted from the indices.

11. The method as recited in claim 6, further comprising:
    generating a visualization of the one or more updates to the particular document within the specified time range; and
    causing the visualization to be displayed using a display device.

12. The method as recited in claim 11, wherein the visualization is generated based on a transformation specified in metadata describing the indices.

13. A system, comprising:
    at least one processor; and
    a memory coupled to the at least one processor, wherein the memory stores program instructions, wherein the program instructions, when executed by the at least one processor, cause the at least one processor to:
    generate a plurality of indices, wherein individual indices of the plurality of indices comprise a plurality of pointers to storage locations of a plurality of document updates, and wherein different indices of the plurality of indices cover different time ranges;
    generate metadata describing the plurality of indices, wherein the metadata comprises respective identifiers of a plurality of documents and the different time ranges;

receive a query request after generating the plurality of indices and after generating the metadata, wherein the query request comprises a document identifier and a time range;

determine, based at least in part on the metadata, a subset of the indices that comprise pointers to document updates of a particular document specified by the document identifier within the time range; and retrieve, from the subset of the indices, the document updates occurring within the time range.

14. The system as recited in claim 13, wherein the plurality of indices are generated automatically and periodically.

15. The system as recited in claim 13, wherein, in determining the subset of the indices that comprise the pointers to document updates of the particular document specified by the document identifier within the time range, the program instructions are further executable by the at least one processor to inspect the metadata for the document identifier and for times within the time range.

16. The system as recited in claim 15, wherein the metadata describing the indices comprises a subset of information in the indices.

17. The system as recited in claim 15, wherein the metadata describing the indices comprises one or more headers extracted from the indices.

18. A non-transitory computer-readable storage medium storing program instructions that, when executed on one or more computers, cause the one or more computers to perform:

generating a plurality of indices, wherein individual indices of the plurality of indices comprise a plurality of pointers to storage locations of a plurality of updates to a description of a catalog item, and wherein different indices of the plurality of indices cover different time ranges;

generating index metadata describing the plurality of indices, wherein the index metadata comprises respective identifiers of a plurality of catalog items and the different time ranges;

receiving a query request after generating the plurality of indices and after generating the index metadata, wherein the query request comprises an identifier of the catalog item and a specified time range;

determining, based at least in part on the index metadata, a relevant subset of the indices that correspond to the identifier of the catalog item and to the specified time range;

retrieving, from the relevant subset of the indices, a resulting subset of the plurality of pointers to the storage locations for one or more of the updates to the description of the catalog item within the specified time range; and retrieving the one or more of the updates to the description of the catalog item within the specified time range using the resulting subset of the plurality of pointers.

19. The non-transitory computer-readable storage medium as recited in claim 18, wherein the plurality of indices are generated automatically and periodically.

20. The non-transitory computer-readable storage medium as recited in claim 18, wherein determining the relevant subset of the indices that comprise the identifier of the catalog item within the specified time range comprises inspecting the index metadata for the identifier of the catalog item within the specified time range.

21. The non-transitory computer-readable storage medium as recited in claim 20, wherein the index metadata comprises a subset of information in the indices.

22. The non-transitory computer-readable storage medium as recited in claim 20, wherein the index metadata comprises one or more headers extracted from the indices.

23. The non-transitory computer-readable storage medium as recited in claim 18, wherein a particular index of the plurality of indices is stored using a plurality of partitions.

\* \* \* \* \*